United States Patent
Hanyu

(10) Patent No.: US 8,170,344 B2
(45) Date of Patent: May 1, 2012

(54) IMAGE STORAGE DEVICE, IMAGE STORAGE SYSTEM, METHOD OF STORING IMAGE DATA, AND COMPUTER PROGRAM PRODUCT FOR IMAGE DATA STORING

(75) Inventor: Hitomi Hanyu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1125 days.

(21) Appl. No.: 11/898,560

(22) Filed: Sep. 13, 2007

(65) Prior Publication Data

US 2008/0075370 A1    Mar. 27, 2008

(30) Foreign Application Priority Data

Sep. 15, 2006  (JP) .................... 2006-251726

(51) Int. Cl.
*G06K 9/46* (2006.01)

(52) U.S. Cl. ......... 382/195; 382/254; 382/190; 382/185

(58) Field of Classification Search .................. 382/173, 382/176, 177, 181, 185, 190, 195, 321
See application file for complete search history.

(56) References Cited

U.S. PATENT DOCUMENTS

| | | | |
|---|---|---|---|
| 6,014,464 A * | 1/2000 | Kurzweil et al. | 382/233 |
| 6,633,670 B1 * | 10/2003 | Matthews | 382/176 |
| 7,557,963 B2 * | 7/2009 | Bhattacharjya | 358/3.27 |
| 7,782,339 B1 * | 8/2010 | Hobbs et al. | 345/626 |
| 2006/0023951 A1 * | 2/2006 | Tan | 382/232 |

FOREIGN PATENT DOCUMENTS

| | | |
|---|---|---|
| JP | 2000-148973 | 5/2000 |
| JP | 2003-186635 | 7/2003 |
| JP | 2004-336282 | 11/2004 |
| JP | 2005-159576 | 6/2005 |
| JP | 2006-148292 | 6/2006 |
| JP | 2006/211513 | 8/2006 |

OTHER PUBLICATIONS

Japanese Office Action mailed Jan. 18, 2011.

* cited by examiner

*Primary Examiner* — Stephen Koziol
(74) *Attorney, Agent, or Firm* — Harness, Dickey & Pierce, P.L.C.

(57) ABSTRACT

An image storage device includes a storing unit, a background recognizing unit, an attribute-information generating unit, and an image-data processing unit. The storing unit stores therein image data and first attribute information for each pixel. The background recognizing unit recognizes a background of the image. The attribute-information generating unit generates second attribute information for each pixel based on the background of the image recognized by the background recognizing unit. The image-data processing unit processes the image data based on the second attribute information generated by the attribute-information generating unit.

10 Claims, 5 Drawing Sheets

MAXIMUM DRAWING AREA A

BACKGROUND B

NON-BACKGROUND C

IMAGE STORAGE DEVICE, IMAGE STORAGE SYSTEM, METHOD OF STORING IMAGE DATA, AND COMPUTER PROGRAM PRODUCT FOR IMAGE DATA STORING

CROSS-REFERENCE TO RELATED APPLICATIONS

The present application claims priority to and incorporates by reference the entire contents of Japanese priority document, 2006-251726 filed in Japan on Sep. 15, 2006.

BACKGROUND OF THE INVENTION

1. Field of the Invention

The present invention relates to a technology for eliminating noise appearing on a background of an image when processing the image.

2. Description of the Related Art

Typically, when outputting image data having a specific color space and a specific data format from a first device to a second device, the color space and the data format of the image data are converted to those that are acceptable to the second device. By using this technique, image data stored in a laser printer (LP) or a multifunction product (MFP) on a network can be transmitted to some other printer on the same network and get printed there. Moreover, image data stored on a certain device can be distributed to other devices, or can be processed by using a personal computer (PC). Therefore, possibilities have increased that a color space for monitor display (hereinafter, "monitor color space") is widely employed.

Sometimes data for monitor display (hereinafter, "monitor data") is required to be converted into data for printing (hereinafter, "print data"). When doing so, the data format and the color space are converted into compatible format and space. To adjust the color space between the monitor data and the print data, some color conversion methods are prepared and an appropriate one of the color conversion methods is employed for each object, or an appropriate processing is performed on each of the objects to obtain both better tone and sharpness of the image. Because attribute information is necessary for selecting an appropriate color conversion method, images are stored in combination with corresponding attribute information.

For example, Japanese Patent Application No. 2000-148973 discloses an image processing system including a printer, in which image data is generated in combination with attribute information for each pixel of the image, and the image data is processed according to the contents of the attribute information before the image is printed out. Specifically, the printer switches processing methods for converting image data to output a high-quality image.

Because both of the image data and the attribute information need to be stored for each pixel, it is desirable that a size of the data should be as small as possible. The typical monitor color space corresponds to RGB (red, greed, and blue) 8-bit data. For example, when the image data is stored by using the color space and data format corresponding to the monitor color space, the data size becomes three times an image size. If the printing resolution is, for example, 600 dots per inch (dpi) in the A-3 size, a large memory capacity of about 198 mega bytes (Mbytes) is required for the image. Therefore, an image data compression is essential for storing the image data, and a lossy compression method is more suitable than a lossless compression method to such large data.

While some data loss is caused with the lossy compression method, the lossy compression method greatly increases the data compression ratio. For this reason, the lossy compression method is widely used to compress a still image, a video, and audio data, which is not greatly influenced by data loss or a change in the data not as in the case of computer programs or character data, realizing a highly-efficient data compression.

In an image compressed by using the lossy compression method, however, noise sometimes appears on the image in an area, which corresponds to a white area (or the single-color background) of the original image, even with an adjustment of a compression parameter. A color sometimes appearing on the white area (or the single-color background) of the original image, for example, around a character, is visually noticeable. Although the lossless compression method that causes no data loss can be used instead, high compression efficiency cannot be obtained compared to the lossy compression method.

SUMMARY OF THE INVENTION

It is an object of the present invention to at least partially solve the problems in the conventional technology.

According to an aspect of the present invention, there is provided an image storage device that includes a storing unit that stores therein image data of an image compressed by using a lossy compression method, and stores therein attribute information for each pixel of the image compressed by using a lossless compression method, the attribute information including a plurality of pieces of sub-attribute information; a background recognizing unit that recognizes a background of the image; an attribute-information generating unit that generates and updates sub-attribute information in the attribute information stored in the storing unit for each pixel based on the background of the image recognized by the background recognizing unit thereby updating the attribute information; and an image-data processing unit that processes the image data based on updated second attribute information.

According to another aspect of the present invention, there is provided a method of storing image data including storing image data of an image compressed by using a lossy compression method in a storing unit; storing attribute information for each pixel of the image compressed by using a lossless compression method in the storing unit, the attribute information including a plurality of pieces of sub-attribute information; recognizing a background of the image; generating and updating sub-attribute information in the attribute information stored in the storing unit for each pixel based on the background of the image recognized at the recognizing; and processing the image data in the storing unit based on the sub-attribute information generated at the generating.

According to another aspect of the present invention, there is provided a computer program product that includes a computer-readable recording medium that stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
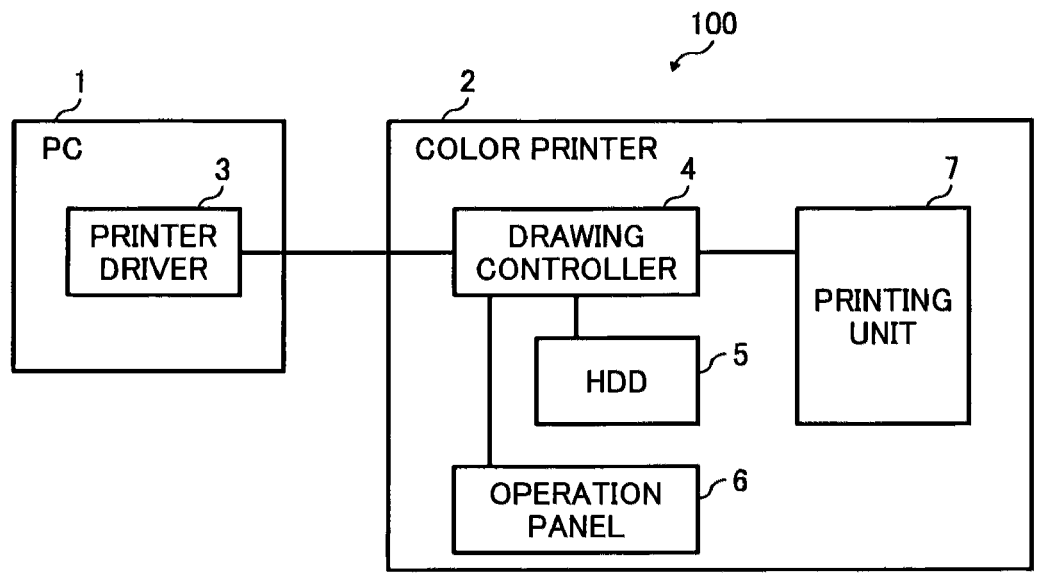
FIG. 1 is a block diagram of an image storage system including a color printer and a PC according to an embodiment of the present invention.

FIG. 1 is a block diagram of an image storage system 100 according to an embodiment of the present invention. The image storage system 100 includes a personal computer (PC) 1 and a color printer 2 that is an image storage unit. A PC or any other device that can store therein images can be used in place of the color printer 2. The PC 1 includes a printer driver 3. The color printer 2 includes a drawing controller 4, a hard disk drive (HDD) 5, an operation panel 6, and a printing unit 7.

The printer driver 3 sends a store command to the color printer 2. The store command includes image data to be stored in the color printer 2. When the color printer 2 receives a print command, the color printer 2 stores the image data in the HDD 5. When a user wants to print an image among the images stored in the HDD 5, the user selects a desired image and issues a print command by operating the operation panel 6.

Figure 2:
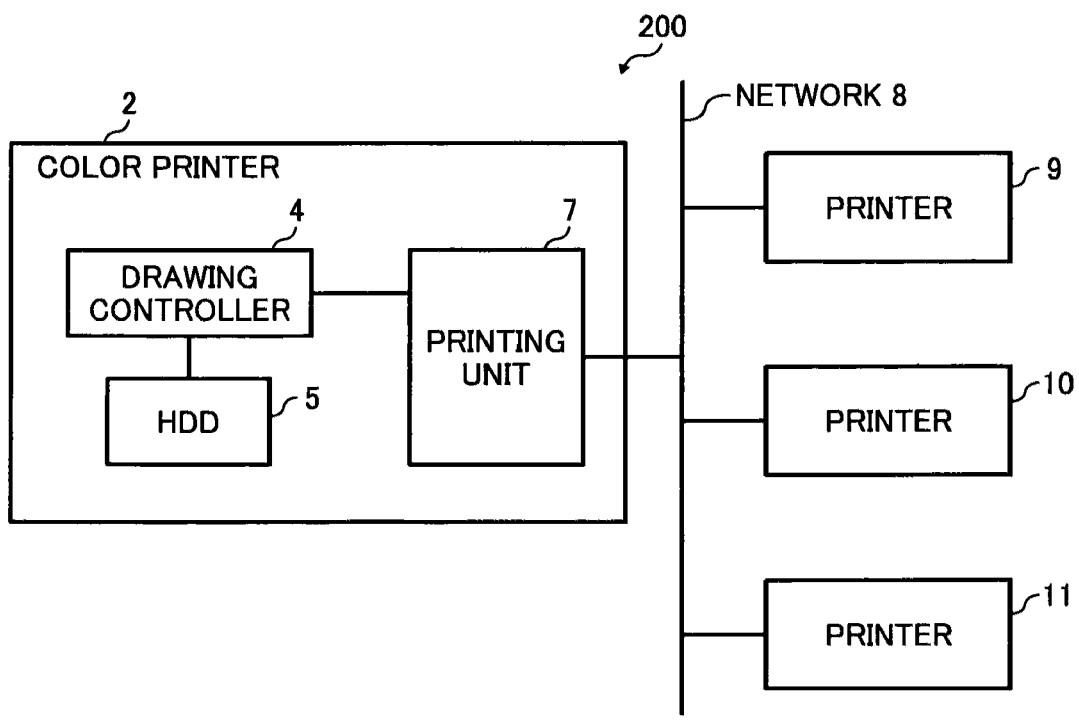
FIG. 2 is a schematic diagram of an image storage system including the color printer shown in FIG. 1 connected to a plurality of printers via a network.

FIG. 2 is a schematic diagram of an image storage system 200 including the color printer 2 that is connected to a plurality of printers 9 to 11 via a network 8. Any one of the printers 9 to 11 can be selected for printing the images stored as image data in the HDD 5. It is not necessary that the print command be issued by using the operation panel 6. In other words, a display application 12 of the PC 1 can be used to issue a print command, or any other method or device can be used to issue a print command.

Figure 3:
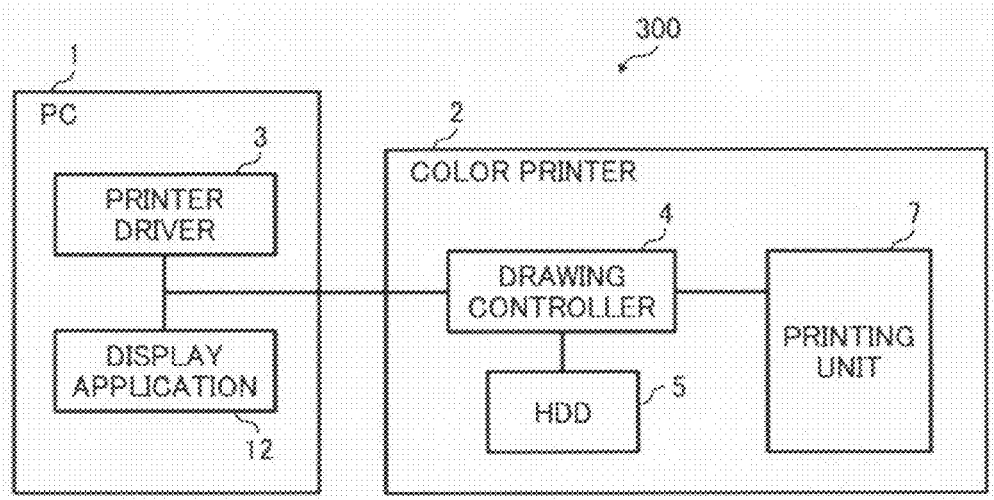
FIG. 3 is another block diagram of the image storage system shown in FIG. 1.

FIG. 3 is a block diagram of an image storage system 300. The PC 1 includes the printer driver 3 and the display application 12. The color printer 2 includes the drawing controller 4, the HDD 5, and the printing unit 7. Image data to be printed from among the image data stored in the HDD 5 can be printed by issuing a print command by using the display application 12.

The image data stored in the HDD 5 of the color printer 2 may be output to another device for displaying or printing. Therefore, the image data needs to be stored with a data format and a color space that clearly define the image data and that can be converted to other data formats and color spaces. In view of this, the image data is stored in the HDD 5 in a data format and a color space for widely acceptable monitor display.

Figure 4:
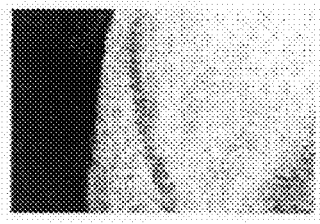
FIGS. 4 to 6 are images for explaining examples of noise.
Figure 5:
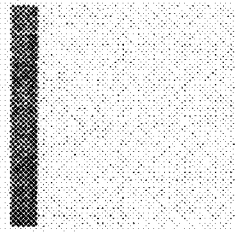
Figure 6:
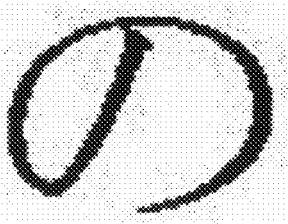

The image data is compressed by using the lossy compression method and stored in the HDD 5 as compressed data. However, the lossy compression method sometimes causes compression noise that lowers visual image quality. The noise may be noticeable at some areas while it may not be noticeable at other areas in the image. Examples of noise are explained with reference to FIGS. 4 to 6. As shown in FIG. 4, some noise appearing on the drawing area of a photographic image is not particularly noticeable in many cases. As shown in FIG. 5, image noise does not commonly appear on an area colored in a single color (hereinafter, "evenly-colored area"). However, as shown in FIG. 6, noise appearing on the evenly-colored background of a line drawing, such as character drawing or graphic drawing, is prominent and therefore annoying in many cases. The embodiments aim to eliminate such visually noticeable noise.

Figure 7:
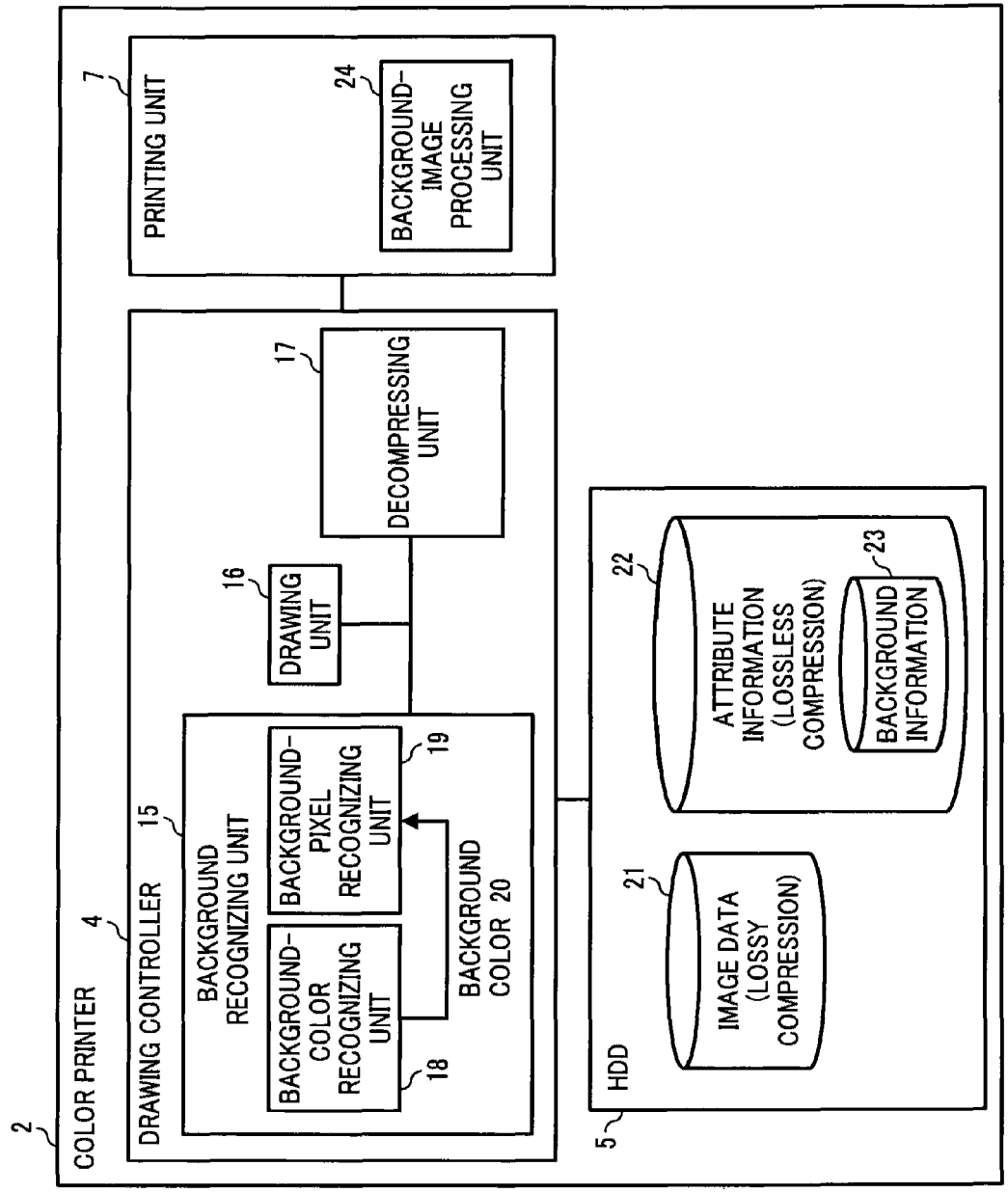
FIG. 7 is a block diagram of the color printer.

FIG. 7 is a detailed block diagram of the color printer 2. The drawing controller 4 includes a background recognizing unit 15, a drawing unit 16, and a decompressing unit 17. The background recognizing unit 15 includes a background-color recognizing unit 18 and a background-pixel recognizing unit 19. The HDD 5 stores therein image data 21 compressed by using the lossy compression method, and attribute information 22 containing background information 23 compressed by using the lossless compression method. The printing unit 7 includes a background-image processing unit 24.

Figure 11:
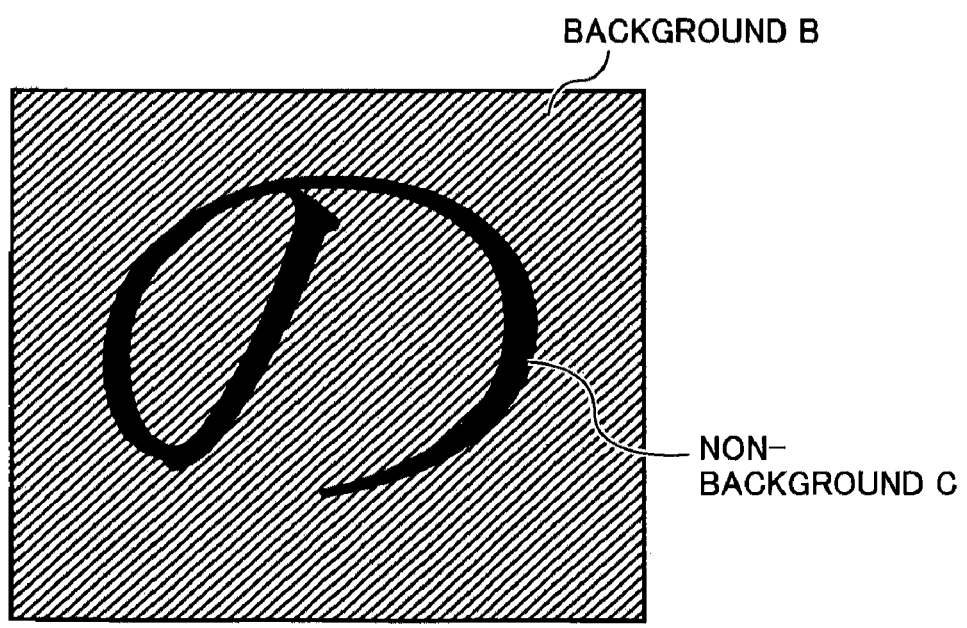
FIG. 11 is an image for explaining a background and a non-background according to the embodiment.

If the background color is always white, the background recognizing unit 15 can be configured to include only the background-pixel recognizing unit 19. However, if the background color is a single color other than white, the background recognizing unit 15 is configured to include the background-color recognizing unit 18 in addition to the background-pixel recognizing unit 19. The background recognizing unit 15 judges whether a pixel corresponds to a "background" or a "non-background" of an image based on the background information 23. FIG. 11 is an example image for explaining the pixels corresponding to the background and the non-background. The method of determining whether the pixel corresponds to the background or the non-background is explained below.

Figure 8:
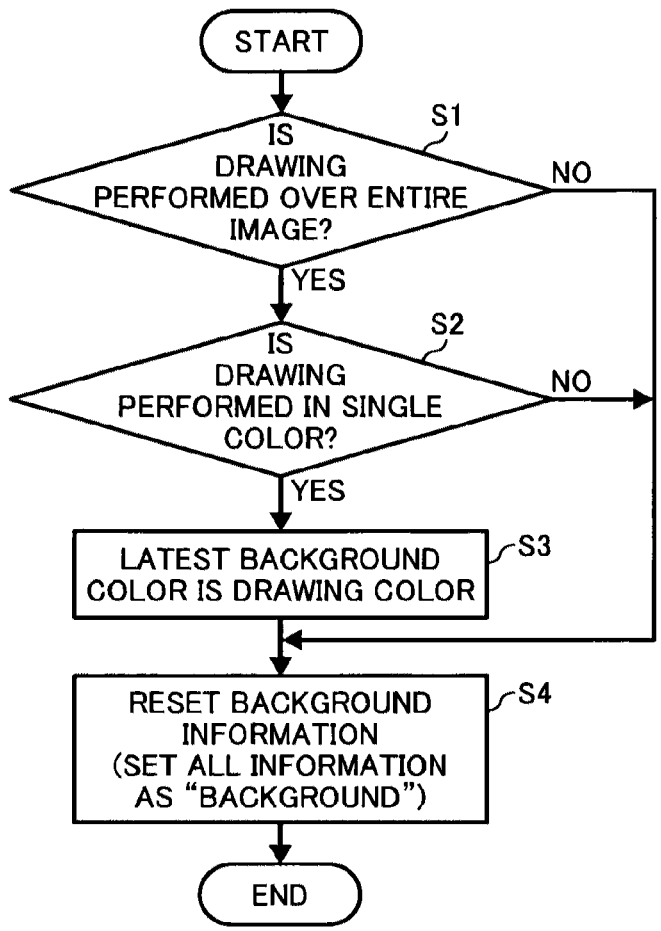
FIG. 8 is a flowchart of a process procedure performed by a background recognizing unit shown in FIG. 1.
Figure 10:
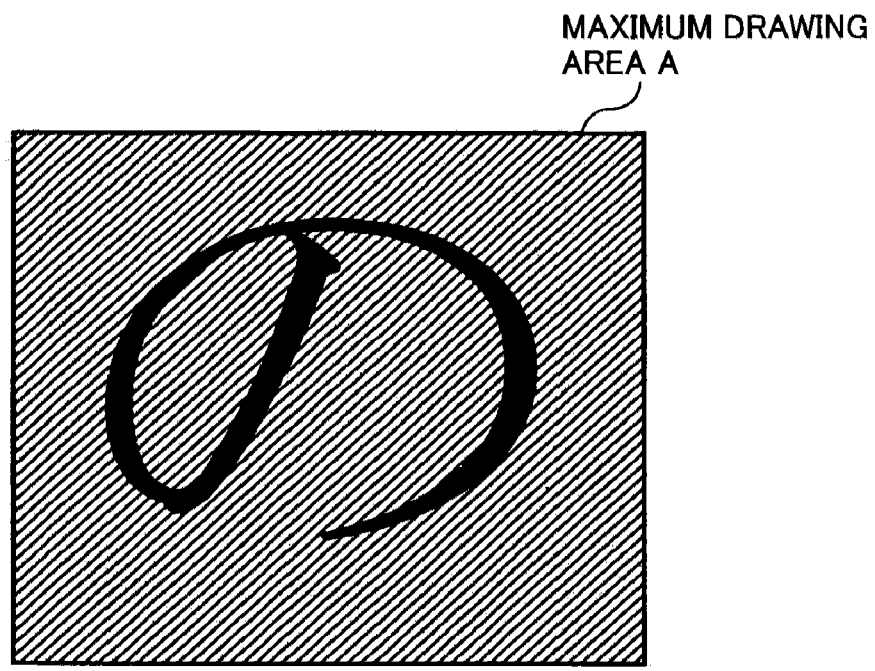
FIG. 10 is an image for explaining the maximum drawing area according to the embodiment.

FIG. 8 is a flowchart of a process procedure performed by the background-color recognizing unit 18. The background-color recognizing unit 18 recognizes the background color based on a color specified in a drawing command and drawing coordinates information from the drawing unit 16. When the drawing is performed over the entire image, i.e., a maximum drawing area A shown in FIG. 10 (Yes at step S1), in addition, the drawing is performed in a single color (Yes at step S2), the background-color recognizing unit 18 recognizes the drawing as the latest background and regards the single color as a background color 20 (step S3). Subsequently, the background information 23 is reset. In other words, the background information 23 of every pixel is set as a "background" (step S4). The background information 23 contained in the attribute information 22 represents whether each pixel corresponds to a background or a non-background.

Figure 9:
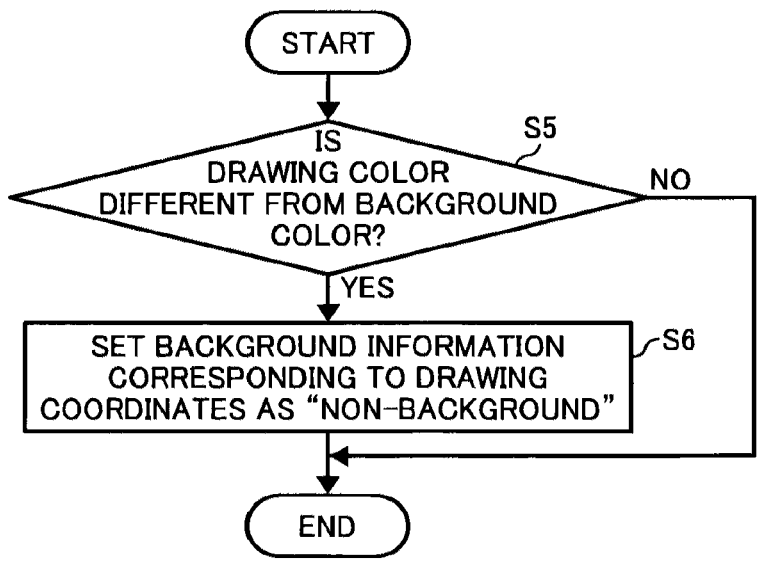
FIG. 9 is a flowchart of a process procedure performed by a background-pixel recognizing unit shown in FIG. 1.

FIG. 9 is a flowchart of a process procedure performed by the background-pixel recognizing unit 19. The background-pixel recognizing unit 19 judges whether drawing is performed on the background, based on a color specified in a drawing command and drawing coordinates information from the drawing unit 16. Thereafter, the background-pixel recognizing unit 19 resets the background information 23 as appropriate. Specifically, if drawing is performed using a color different from the background color 20 (step S5), which is set at step S3, after the background information 23 is reset at step S4 and the background information 23 on every pixel is set as the "background", the background-pixel recognizing unit 19 recognizes that the drawing is performed in an area of the "background" although the area is not a part of the background (see a non-background C shown in FIG. 11) of the image. Then, the background information 23 corresponding to the drawing coordinates is set as "non-background" (step S6).

The background-image processing unit 24 of the printing unit 7 performs output processing using the background color 20, which is set by the background-color recognizing unit 18 at step S3, on the pixels, on which the background information 23 is set as the "background", regardless of the contents of the image data. If the image is output based on the image data, noise (a different color) may be disadvantageously caused on the background of the output image. However, the image can be output without noise by setting colors of all of the pixels having "background" attribute to the background color 20.

According to the embodiment, the background recognizing unit 15 generates information (background information 23) for recognizing the white (or the evenly-colored background) area of an original image, and the background-image processing unit 24 performs the image processing such that pixels having the "background" attribute is forcibly output in white (or the set background color 20). Accordingly, the noise appearing due to the lossy data compression can be prevented from appearing on the image, thereby preventing visually-noticeable image degradation. Even when noise appears on the background in the image data due to lossy data compression, the background of the image can be forcibly output in the set background color 20 so that no visually noticeable image degradation is caused. Therefore, favorable images can be obtained even from compression image data obtained by compressing image data by using the lossy compression method that increases the data compression efficiency, so that the memory capacity needed for the compressed image data can be reduced.

A computer program according to the present invention causes a CPU to implement the process procedures explained with reference to the flowcharts shown in FIGS. 8 and 9. A recording medium that stores therein the computer program can be a semiconductor storage medium an optical or magnetic storage unit. Even in another system whose configuration is different from the system according to the embodiment, substantially same effects can be obtained by using the above computer program and recording medium and causing a CPU in the other system to execute the computer program.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image storage device comprising:
   an image data storage unit configured to store image data by using lossy compression;
   a drawing unit configured to generate color information and drawing coordinates information of a drawing command;
   an attribute information storage unit configured to store attribute information of each pixel of the image data by using lossless compression;
   a background recognizing unit configured to recognize a background portion of the image data, the background recognizing unit including,
     a background color recognizing unit configured to recognize a background color based on the color information generated by the drawing unit, and
     a background pixel recognizing unit configured to recognize whether each pixel corresponds to the background based on the drawing coordinates information of a drawing command generated by the drawing unit;
   an attribute-information generating unit configured to generate background information of each pixel, the respective background information indicating whether each respective pixel is part of the background portion of the image data; and
   a background image processing unit configured to switch between image processing functions for an output according to the background information generated by the attribute information generating unit.

2. The image storage device according to claim 1, wherein the respective background information indicates whether the each respective pixel corresponds to a white background, and
   the background recognizing unit is configured to recognize the white background.

3. The image storage device according to claim 2, wherein the background recognizing unit is configured to receive a color information and a drawing coordinate information from the drawing unit, and
   if the color information indicates other than white, the background recognizing unit is configured to set the respective background information of a pixel corresponding to the drawing coordinate information to be non-background.

4. The image storage device of claim 3, wherein, if the background information generated by the attribute information generating unit indicates that the pixel corresponding to the drawing coordinate information is part of the background portion of the image data, the background image processing unit is configured to output the pixel corresponding to the drawing coordinate information as white regardless of the image data.

5. The image storage device of claim 1, wherein the background color recognizing unit is configured to recognize a uniform drawing color as the background color if an area the same as a maximum drawing area is drawn using the uniform drawing color.

6. The image storage device of claim 5, wherein the background pixel recognizing unit is configured to receive a color information and a coordinates information from the drawing unit, and
   if the color information indicates other than the background color, the background pixel recognizing unit is configured to set the background information of a pixel corresponding to the coordinates information as non-background.

7. The image storage device according to claim 6, wherein, if the background information of a pixel generated by the attribute information generating unit indicates that the pixel corresponds to the background portion of the image data, the background image processing unit is configured to output the pixel as the background color regardless of the image data, the background color being the background color recognized by the background color recognizing unit.

8. An image storage system comprising:
   the image storage device according to claim 1; and
   at least one information terminal device connected to the image storage device via a network.

9. An image storing method comprising:
   storing, by an image data storage unit, an image data compressed using lossy compression;
   storing, by an attribute information storage unit, an attribute information of each pixel of the image data by using lossless compression;

generating, by a drawing unit, color information and drawing coordinates information of a drawing command;

recognizing, by a background recognizing unit, a background portion of the image data;

generating, by an attribute information generating unit, the respective background information of each respective pixel, the background information indicating whether each respective pixel is part of the background portion of the image data; and switching, by a background image processing unit, between image processing functions for an output according to the background information generated by the attribute information generating unit, wherein the recognizing includes, recognizing, by a background color recognizing unit, a background color and recognizing, by a background pixel recognizing unit, whether each pixel corresponds to the background based on the drawing coordinates information of a drawing command generated by the drawing unit.

10. A computer program product comprising a non-transitory computer-readable medium having computer-readable program codes for storing image data, the program codes when executed causing an image storage device to execute:

storing, by an image data storage unit, image data by using lossy compression;

storing, by an attribute information storage unit, attribute information of each pixel of the image data by using lossless compression;

generating, by a drawing unit, color information and drawing coordinates information of a drawing command;

recognizing, by a background recognizing unit, a background portion of the image data;

generating, by an attribute information generating unit, background information of each pixel, the respective background information indicating whether each respective pixel is part of the background portion of the image data; and switching, by a background image processing unit, between image processing functions for an output according to the background information generated by the attribute information generating unit, wherein the recognizing includes, recognizing, by a background color recognizing unit, a background color, and recognizing, by a background pixel recognizing unit, whether each pixel corresponds to the background based on the drawing coordinates information of a drawing command generated by the drawing unit.

* * * * *